(12) United States Patent
Sharma

(10) Patent No.: US 8,891,818 B2
(45) Date of Patent: Nov. 18, 2014

(54) METHOD AND APPARATUS FOR TRACKING OBJECTS ACROSS IMAGES

(75) Inventor: Vinay Sharma, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 528 days.

(21) Appl. No.: 12/910,494

(22) Filed: Oct. 22, 2010

(65) Prior Publication Data

US 2011/0135150 A1 Jun. 9, 2011

Related U.S. Application Data

(60) Provisional application No. 61/267,578, filed on Dec. 8, 2009.

(51) Int. Cl.
*G06K 9/00* (2006.01)
*G06T 7/20* (2006.01)

(52) U.S. Cl.
CPC ... *G06K 9/00771* (2013.01); *G06T 2207/30196* (2013.01); *G06T 7/2033* (2013.01); *G06T 7/208* (2013.01); *G06T 2207/30232* (2013.01)
USPC .......................................... 382/103; 382/168

(58) Field of Classification Search
USPC ................................. 382/103, 168
See application file for complete search history.

(56) References Cited

U.S. PATENT DOCUMENTS 7,620,202 B2 * 11/2009 Fujimura et al. .............. 382/103
8,031,906 B2 * 10/2011 Fujimura et al. .............. 382/103

OTHER PUBLICATIONS

Davis et al, Human Detection and Tracking, Jul. 2009, Encyclopedia of Biometrics: I-Z, vol. 2, pp. 42-46.*
Pinho et al, An Efficient and Robust Tracking System using Kalman Filter, 2006, VIP Symposia on Internet related research with elements of M+I+T, pp. 1-8.*
Jacquot et al, Adaptive Tracking of Non-Rigid Objects Based on Color Histograms and Automatic Parameter Selection, Jan. 2005, Seventh IEEE Workshops on Application of Computer Vision, 2005. WACV/MOTIONS '05, vol. 1, pp. 1-7.*
Yi et al, A new motion histogram to index motion content in video segments, 2005, Pattern Recognition Letters, vol. 26, pp. 1-11.*
Navneet Dalai, Bill Triggs and Cordelia Schmid, "Human Detection Using Oriented Histograms of Flow and Appearance," Computer Vision—ECCV 2006, Lecture Notes in Computer Science, vol. 3952, 2006, pp. 428-441.*
J. A. Nelder, R. Mead, "A Simplex Method for Function Minimization," The Computer Journal, vol. 7, No. 4., 1965, pp. 308-313.

(Continued)

*Primary Examiner* — Utpal Shah
(74) *Attorney, Agent, or Firm* — Mirna Abyad; W. James Brady; Frederick J. Telecky, Jr.

(57) ABSTRACT

A method and apparatus for tracking objects across images. The method includes retrieving object location in a current frame, determining the appearance and motion signatures of the object in the current frame, predicting the new location of the object based on object dynamics, searching for a location with similar appearance and motion signatures in a next frame, and utilizing the location with similar appearance and motion signatures to determine the final location of the object in the next frame.

15 Claims, 2 Drawing Sheets

(56) References Cited

OTHER PUBLICATIONS

Bhattacharyya, A. "On a measure of divergence between two statistical populations defined by their probability distributions" Bulletin of the Calcutta Mathematical Society 35: 99-109, 1943.

Kalman, R. E. "A new approach to linear filtering and prediction problems" Journal of Basic Engineering 82 (1): 35-45., 1960.

D. Comaniciu, R. Visvanathan, P. Meer, "Kernel-Based Object Tracking", IEEE Trans. Pattern Anal. Mach. Intell., vol. 25 (5), 2003, pp. 564-577.

T. Liu, H. Chen, "Real-Time Tracking Using Trust-Region Methods," IEEE Trans. Pattern Anal. Mach. Intell., vol. 26 (3), pp. 397-402, 2004.

\* cited by examiner

METHOD AND APPARATUS FOR TRACKING OBJECTS ACROSS IMAGES

CROSS-REFERENCE TO RELATED APPLICATIONS

This application claims benefit of U.S. provisional patent application Ser. No. 61/267,578, filed Dec. 8, 2009, which is herein incorporated by reference.

BACKGROUND OF THE INVENTION

1. Field of the Invention

Embodiments of the present invention generally relate to a method and apparatus for tracking objects across images.

2. Description of the Related Art

Object tracking is a fundamental requirement in many computer vision based applications: it enables the application to assign unique identifiers (or labels) to all detected objects in the scene, and maintains the mapping between objects and identifiers over time as the objects move and interact in the scene. The challenge is to be able to preserve the correct object identifiers in spite of changing illumination in the scene, changes in appearance of the object, occlusions, interactions between objects, etc.

SUMMARY OF THE INVENTION

Embodiments of the present invention relate to a method and apparatus for tracking objects across images. The method includes retrieving object location in a current frame, determining the appearance and motion signatures of the object in the current frame, predicting the new location of the object based on object dynamics, searching for a location with similar appearance and motion signatures in a next frame, and utilizing the location with similar appearance and motion signatures to determine the final location of the object in the next frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Tracking enables the application to make intelligent decisions. For example, in video surveillance, object tracking enables an application to detect when a person crosses a pre-defined zone, identify if a person has been following a 'suspicious' path, etc. In human-device interfaces, an application can employ the object tracker to track the user's hands, and determine what gestures are being performed by the user.

In one embodiment, the object detection module determines the location and size of all objects in the scene. The object tracker is then responsible for assigning and maintaining unique identities for each object as they move in the scene.

Figure 1:
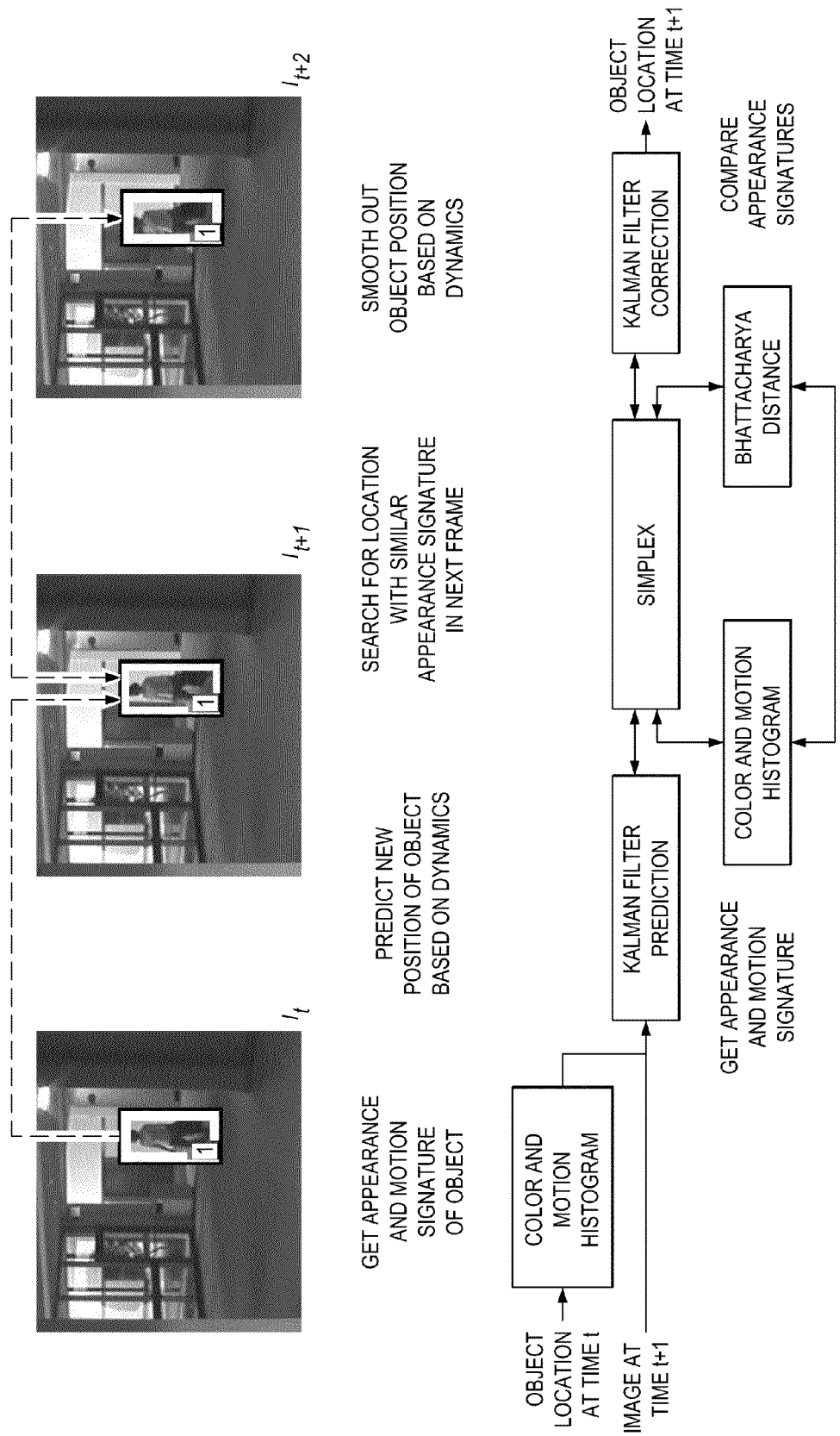
FIG. 1 is an embodiment depicting an overview of tracking algorithm.

An overview of an embodiment of the proposed tracking algorithm is provided in FIG. 1. FIG. 1 is an embodiment depicting an overview of tracking algorithm.

In this embodiment, the approach uses the Nelder-Mead Simplex to search for the best matching image location in the next frame corresponding to the known object size and location in the current frame. The features that are matched during the simplex search are derived from a combination of motion and appearance histograms. The metric used in this embodiment to quantify the match is the Bhattacharya distance. The method may employ a Kalman filter to initialize the start location of the simplex search in a new frame and/or predict step. The Kalman filter may also be employed to smooth out the estimated location and/or correct step.

Details of the specific blocks of the algorithm are described next, highlighting the advantages or novelty of each step. In one embodiment, for each object $O_i$ in frame $I_t$, we extract motion and appearance histograms. Object $O_i$ is described as follows $O_i=[x, y, w, h]$, where x,y are image coordinates of the center, and w,h are the dimensions of the bounding box that best represents the scale of the object.

Figure 2C:
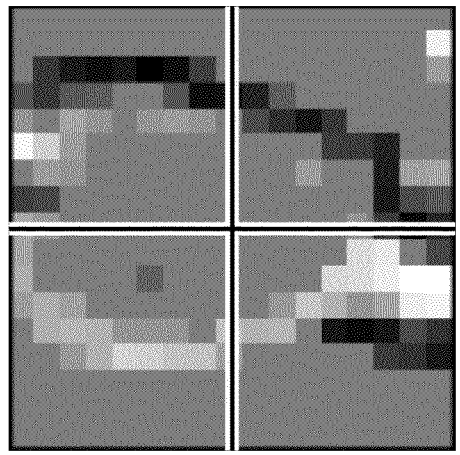
FIG. 2 is an embodiment depicting feature computation. (a) Detected bounding boxes around object, (b) Motion feature computation, (c) Appearance feature computation showing center-surround kernel weights.
Figure 2B:
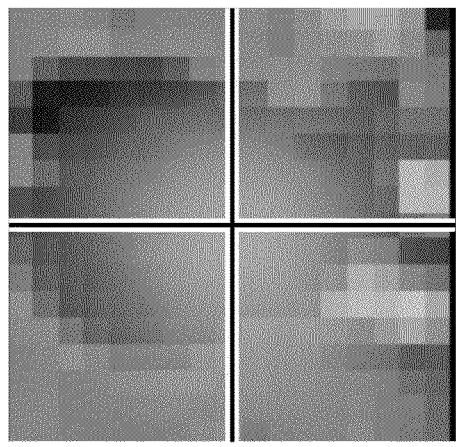
Figure 2A:
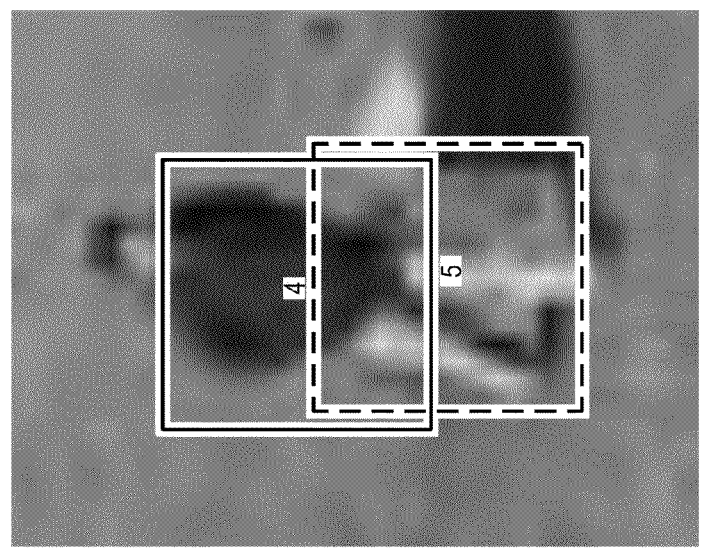

FIG. 2 is an embodiment depicting feature computation. (a) Detected bounding boxes around object, (b) Motion feature computation, (c) Appearance feature computation showing center-surround kernel weights. For both the appearance and motion features, we compute histograms in non-overlapping regions and then combine them. In the case of the motion feature, this captures the spatial distribution of the motion pixels, providing a motion signature for each object. Similarly, for the appearance feature, dividing the image region enables the tracker to have a better sense of the spatial layout of the object.

For the motion histogram, we first compute the thresholded image difference $I_D$ $$I_{Diff} = I_t - I_{t-1}$$

$$I_D^i = \begin{cases} I_{Diff}^i & |I_{Diff}^i| \geq T \\ 0 & |I_{Diff}^i| < T \end{cases}$$

where T is a threshold that can be set by the application based on the required sensitivity.

The bounding box for $O_i$ is then divided into four equal quadrants as shown in FIG. 2(c) and the histograms is computed in each of the four quadrants. For a typical 8-bit image, the range of the pixel values in $I_D$ is bounded in the range [−255, 255]. Additionally, taking into consideration threshold T, the range may be further divided as [−255,−T] U [T, 255]. This information can be useful in determining the bin edges of the histograms. Denoting the histograms in each of the quadrants as h1, h2, h3, h4, the final motion histogram feature is defined as $H_m$=[h1, h2, h3, h4], where [ ] performs a simple concatenation operation.

For the appearance histogram, $H_a$, we proceed in a similar fashion using the current frame $I_t$. We divide the image region corresponding to $O_i$ in $I_t$ into 4 quadrants, as shown in FIG. 2(b). We also apply a kernel weighted approach that assigns a higher weight to the center of the object bounding box, and lesser weight to the surrounding background regions. As with the motion histogram, we combine the individual appearance histograms to arrive at the appearance feature $H_a$=[h1, h2, h3, h4].

During the Simplex search, we may employ the Bhattacharya distance to measure the similarity of the motion and appearance features. We then combine the motion and appearance Bhattacharya distance into a single score using a weighted average.

Using both appearance and motion features makes our tracking algorithm robust to a variety of conditions that typically impede the performance of other methods. The motion features are relatively invariant to changes in ambient illumination, and conversely, the appearance features are invariant to the dynamics of the object. Thus this combination provides a powerful complementary feature set for tracking.

The search algorithm used is the Nelder-Mead Simplex, often used in optimization problems for function minimization. We found it ideally suited for real-time tracking in embedded platforms. For object $O_i$=[x,y,w,h], we employed the Simplex search to minimize following function $$F(c,r,s)=K(B(H_a^{t+1}(c,r,s \cdot w,s \cdot h),H_a^t(x,y,w,h),B(H_m^{t+1}(c,r,s \cdot w,s \cdot h),H_m^t(x,y,w,h))$$

where, $H_a$ and $H_m$ are appearance and motion feature vectors, and the superscripts t and t+1 denote current frame and the next frame. $B(\cdot)$ denotes the Bhattacharya distance between two features, and $K(\cdot)$ represents a function combining the Bhattacharya distance scores. The symbols c, r, and s stand for the 2D image coordinates and the scale of the rectangular image region on which the features are computed.

In one embodiment, the solution employs Nelder-Mead Simplex to search for object location in next frame. The NM Simplex is well suited for efficient tracking in embedded platforms. It is a classic optimization method used often to search over a solution space in function minimization problems. Typically, object tracking algorithms utilize search mechanisms such as mean-shift and trust regions.

While these methods might be more optimal than simplex from a strictly function minimization perspective, the simplex method has characteristics that make it attractive for fast and efficient tracking, especially in resource-bound embedded platforms. The simplex method does not require a closed-form expression of the function, nor does it require calculating of the slope (derivative) of the function. Since derivatives need not be computed, the simplex method typically requires fewer evaluations of the function, thus saving time. Further, the Simplex method is a search algorithm that can be completely implemented using fixed-point representation. Fixed-point code typically runs faster than corresponding floating point implementations.

In addition, in one embodiment the solution handles scale changes within the Simplex search procedure. Changes in object scale (or size) are often problematic for 2D object trackers. As an object moves closer or farther from the camera, the object size varies, and if the tracker does not update the scale of its feature computation, the algorithm may drift away from (or lose track of) the object. Instead of using the simplex technique to merely search for the best matching fixed size region in 2D, we include the scale of the object in the parameter list of the function to be minimized. Thus, the simplex searches in spatial as well as scale space for the best match. Increasing the dimensionality of the function has the drawback of potentially increasing the complexity of the search space, making it more time consuming. To limit this problem, we introduce only one extra dimension, a single scale parameter for both width and height. Thus the function changes from F(x,y) to F(x,y,s).

The solution may also use a combination of motion and appearance features. A desired characteristic of features used in tracking is constancy, or robustness to changes in appearance, illumination, etc. We strive to achieve this goal by using a combination of motion and appearance features. The motion features are helpful in disambiguating objects from stationary parts of the scene, and also from other objects with very different motion signatures than the one being tracked. It is also quite robust to ambient illumination fluctuations. The motion features are however not very discriminative between moving objects of the same type, such as two persons walking close to each other and often overlapping in the image. In these scenarios, our appearance features are helpful in separating out objects. Further, the appearance features are helpful in maintaining tracking even when objects become stationary (and the motion features are useless).

The solution may also use spatially separated histograms for motion and appearance. Histograms of intensity values are commonly used features. In tracking they have a limitation in that they do not provide any information about the spatial distribution (or arrangement) of the intensity values. We attempt to mitigate this drawback by computing histograms in 4 separate quadrants of the object's bounding box and concatenating these individual histograms to form our feature vector. Additionally, for the appearance features, we also adopt a kernel weighted histogram computation so that we have more weight assigned to the center of the object and lesser weight to the surrounding background.

Such embodiments present advantages, such as, a) robust to illumination changes by relying on appearance and motion signature, b) provision to be adaptive to scale changes by Incorporating scale dimension in simplex, c) faster processing by utilizing the chosen algorithm components and the optimized implementation, e) robust to small/brief occlusions based on underlying Kalman filter, and the likes.

While the foregoing is directed to embodiments of the present invention, other and further embodiments of the invention may be devised without departing from the basic scope thereof, and the scope thereof is determined by the claims that follow.

What is claimed is:

1. A method for tracking an object across images using a processor, the method comprising:
   retrieving an object location in a current frame;
   determining an appearance signature of the object and motion signature of the object in the current frame;
   predicting the new location of the object based on object dynamics;
   searching for a location with similar appearance and motion signatures in a next frame utilizing Nedler-Mead Simplex; and
   utilizing the location with similar appearance and motion signatures to determine the final location of the object in the next frame.

2. The method of claim 1 further comprising smoothing out the location of the object based on object dynamics.

3. The method of claim 2, wherein the smoothing out step utilizes a Kalman Filter correction.

4. The method of claim 1, wherein the step for predicting the new location utilizes a Kalman Filter prediction.

5. The method of claim 1, wherein the step for searching for the location with similar appearance signature utilizes Simplex search method.

6. The method of claim 5, wherein the Simplex search method comprises:

computing original appearance and motion signatures from the known location and size of the object in the current frame;

determining candidate locations and sizes in the next frame computing appearance and motion signatures from these candidate image locations and sizes determined by the Simplex search; and calculating a distance measure between the original appearance and motion signatures and each new appearance and motion signature computed during the Simplex search.

7. The method of claim 6, wherein computing the appearance comprises:

computing spatially separated histograms of at least one of the intensity and color values of the pixels corresponding to the image region occupied by the object.

8. The method of claim 6, wherein the motion signatures comprises:

computing spatially separated histograms of the intensity difference values of the pixels corresponding to the image region occupied by the object.

9. The method of claim 6, wherein the distance measure comprises:

computing the a Bhattacharya distance between the original appearance histograms and the appearance histograms from image locations determined by the simplex search;

computing the Bhattacharya distance between the original motion histograms and the motion histograms from image locations determined by the simplex search; and computing a weighted average of the two Bhattacharya distances to arrive at a single distance measure.

10. A non-transitory computer readable medium with an executable program stored thereon, wherein the program instructs a micro processor to perform a method for tracking an object across images, the method comprising:

retrieving object location in a current frame;

determining the appearance signature of the object and motion signature of the object in the current frame;

predicting the new location of the object based on object dynamics;

searching for a location with similar appearance and motion signatures in a next frame utilizing Nedler-Mead Simplex; and utilizing the location with similar appearance and motion signatures to determine the final location of the object in the next frame.

11. The non-transitory computer readable medium of claim 10 further comprising smoothing out the position of the object based on object dynamics.

12. The non-transitory computer readable medium of claim 11, wherein the smoothing out step utilizes a Kalman Filter correction.

13. The non-transitory computer readable medium of claim 10, wherein the step for predicting the new location utilizes a Kalman Filter prediction.

14. The non-transitory computer readable medium of claim 10, wherein the step for searching for the location with similar appearance signature utilizes Simplex search method.

15. The non-transitory computer readable medium of claim 14, wherein the Simplex method comprises:

computing original appearance and motion signatures from the known location and size of the object in the current frame;

determining candidate locations and sizes in the next frame computing appearance and motion signatures from these candidate image locations and sizes determined by the Nedler-Mead Simplex search; and calculating a distance measure between the original appearance and motion signatures and each new appearance and motion signature computed during the Simplex search.

* * * * *